(12) United States Patent
Bellare et al.

(10) Patent No.: US 11,637,690 B1
(45) Date of Patent: Apr. 25, 2023

(54) FORMAT PRESERVING ENCRYPTION (FPE) SYSTEM AND METHOD FOR LONG STRINGS

(71) Applicant: BAFFLE, INC., Santa Clara, CA (US)

(72) Inventors: Mihir Bellare, Santa Clara, CA (US); Priyadarshan Kolte, Santa Clara, CA (US)

(73) Assignee: Baffle, Inc., Santa Clara, CA (US)

( * ) Notice: Subject to any disclaimer, the term of this patent is extended or adjusted under 35 U.S.C. 154(b) by 78 days.

(21) Appl. No.: 17/497,664

(22) Filed: Oct. 8, 2021

(51) Int. Cl.
*H04L 29/06* (2006.01)
*H04L 9/06* (2006.01)
*H04L 9/08* (2006.01)

(52) U.S. Cl.
CPC .......... *H04L 9/0631* (2013.01); *H04L 9/0861* (2013.01)

(58) Field of Classification Search
None
See application file for complete search history.

(56) References Cited

U.S. PATENT DOCUMENTS

| | | | |
|---|---|---|---|
| 7,280,663 B1 | 10/2007 | Golomb et al. | |
| 8,281,151 B2 | 10/2012 | Shah et al. | |
| 8,600,048 B1 * | 12/2013 | Hansen | H04L 9/0631 380/42 |
| 8,767,963 B2 | 7/2014 | Huang | |
| 8,811,608 B2 | 8/2014 | Sella et al. | |
| 9,521,124 B2 | 12/2016 | Raykova et al. | |
| 10,289,816 B1 | 5/2019 | Malassenet et al. | |
| 10,630,478 B1 | 4/2020 | Yavuz | |
| 11,569,998 B2 * | 1/2023 | Wang | H04L 9/0894 |
| 2003/0191950 A1 | 10/2003 | Patel et al. | |
| 2009/0041236 A1 | 2/2009 | Gligoroski et al. | |
| 2010/0058070 A1 | 3/2010 | Garay et al. | |
| 2010/0246813 A1 * | 9/2010 | Morris | H04L 9/0631 380/28 |
| 2011/0040820 A1 | 2/2011 | Rane et al. | |
| 2011/0179281 A1 | 7/2011 | Chevallier-Mames et al. | |
| 2011/0211692 A1 | 9/2011 | Raykova et al. | |
| 2012/0002811 A1 | 1/2012 | Smart | |
| 2012/0159194 A1 | 6/2012 | Anderson | |
| 2016/0050070 A1 | 2/2016 | Bohli et al. | |
| 2016/0056954 A1 * | 2/2016 | Lee | H04L 9/0861 380/28 |
| 2017/0163424 A1 | 6/2017 | Kafai et al. | |
| 2017/0201498 A1 | 7/2017 | Baig et al. | |
| 2017/0214521 A1 * | 7/2017 | Busch | H04L 9/0618 |

(Continued)

FOREIGN PATENT DOCUMENTS

| | | |
|---|---|---|
| KR | 101267109 B1 | 5/2013 |
| WO | WO2009115824 A1 | 9/2009 |

OTHER PUBLICATIONS

Bhatt, Zalak, Gupta, Vinit. Advance security technique for format preserving encryption. 2016 International Conference on Inventive Computation Technologies (ICICT). https://ieeexplore.ieee.org/stamp/stamp.jsp?tp=&arnumber=7823194 (Year: 2016).*

(Continued)

*Primary Examiner* — Jeremiah L Avery
(74) *Attorney, Agent, or Firm* — DLA Piper LLP US

(57) ABSTRACT

A format-preserving Just Encrypt 1 (JE1) system and method provides significant performance advantages over known FPE methods for longer character strings due to the technical improvements.

36 Claims, 7 Drawing Sheets

(56) References Cited

U.S. PATENT DOCUMENTS

| | | | |
|---|---|---|---|
| 2018/0089454 A1* | 3/2018 | Iyer | G06F 21/6218 |
| 2018/0091306 A1 | 3/2018 | Antonopoulos et al. | |
| 2018/0114028 A1 | 4/2018 | Kafai et al. | |
| 2018/0115415 A1 | 4/2018 | Teranishi | |
| 2018/0212971 A1 | 7/2018 | Costa | |
| 2018/0349867 A1 | 12/2018 | Trieflinger | |
| 2018/0357427 A1 | 12/2018 | Lindell et al. | |
| 2018/0365290 A1 | 12/2018 | Kaushik et al. | |
| 2019/0068358 A1* | 2/2019 | Gutschow | H04L 9/14 |
| 2019/0171843 A1* | 6/2019 | Sun | G09C 1/00 |
| 2019/0228469 A1 | 7/2019 | Yu et al. | |
| 2019/0286837 A1 | 9/2019 | Yim et al. | |
| 2019/0356468 A1 | 11/2019 | Zeh et al. | |
| 2020/0034550 A1 | 1/2020 | Kim et al. | |
| 2020/0134204 A1 | 4/2020 | Furukawa et al. | |
| 2020/0228325 A1 | 7/2020 | Fan | |
| 2020/0228340 A1 | 7/2020 | Blackhurst et al. | |
| 2020/0259651 A1 | 8/2020 | Mohassel et al. | |
| 2020/0267144 A1 | 8/2020 | Wagner et al. | |
| 2020/0351078 A1 | 11/2020 | Kolte et al. | |
| 2020/0366462 A1 | 11/2020 | Kolte et al. | |
| 2020/0374120 A1* | 11/2020 | Stanley | H04L 9/3213 |
| 2021/0167946 A1 | 6/2021 | Bitan et al. | |
| 2022/0075825 A1* | 3/2022 | Helms | G06Q 40/02 |
| 2022/0391529 A1* | 12/2022 | Farkash | G06F 16/2456 |

OTHER PUBLICATIONS

Mallaiah, Kurra et al. Performance analysis of Format Preserving Encryption (FIPS PUBS 74-8) over block ciphers for numeric data. 2013 4th International Conference on Computer and Communication Technology (ICCCT). https://ieeexplore.ieee.org/stamp/stamp.jsp?tp=&arnumber=6749626 (Year: 2013).*

Gupta, Shikha et al. Ensuring Data Security in Databases Using Format Preserving Encryption. 2018 8th International Conference on Cloud Computing, Data Science & Engineering (Confluence). https://ieeexplore.ieee.org/stamp/stamp.jsp?tp=&arnumber=8442626 (Year: 2018).*

Intel SGX, printed Oct. 1, 2019, 3 pages. https://software.intel.com/en-us/sgx.

Microsoft SEAL, printed Oct. 1, 2019, 4 pages. https://www.microsoft.com/en-us/research/project/microsoft-seal/.

Cybernetica, printed Oct. 1, 2019, 1 page, https://sharemind.cyber.ee/.

Costan et al., "Intel SGX Explained," Computer Science and Artificial Intelligence Laboratory, Massachusetts Institute of Technology, 2016, 118 pages. https://eprint.iacr.org/2016/086.pdf.

Bogdanov et al., "Sharemind:aframeworkforfastprivacy-preserving computations," Univeristy Tartu, AS Cybernetica, 23 pages. 2008. https://eprint.iacr.org/2008/289.pdf.

Bellare, "Encryption Translation: How to Inherit Standard Compliance," UCSD, Baffle, Inc. (Dec. 18, 2018), 27 pages.

Chen et al., "Simple Encrypted Arithmetic Library—SEAL v2.2," Microsoft Research, Royal Holloway, University of London, 33 pages. 2017. https://www.microsoft.com/en-us/research/wpcontent/uploads/2017/06/sealmanual_v2.2pdf.

Chenette, Nathan et al., entitled, "Practical Order-Revealing Encryption with Limited Leakage," Rose-Hulman Institute of Technology, Stanford University, Facebook, Inc., 27 pages. 2016.

Patel et al., "Comparative Evaluation of Elliptic Curve Cryptography Based Homomorphic Encryption Schemes for a Novel Secure Multiparty Computation", Journal of Information Security vol. 5 No. 1(2014), Article ID:42126,7 pages. DOI:10.4236/jis.2014.51002.

* cited by examiner

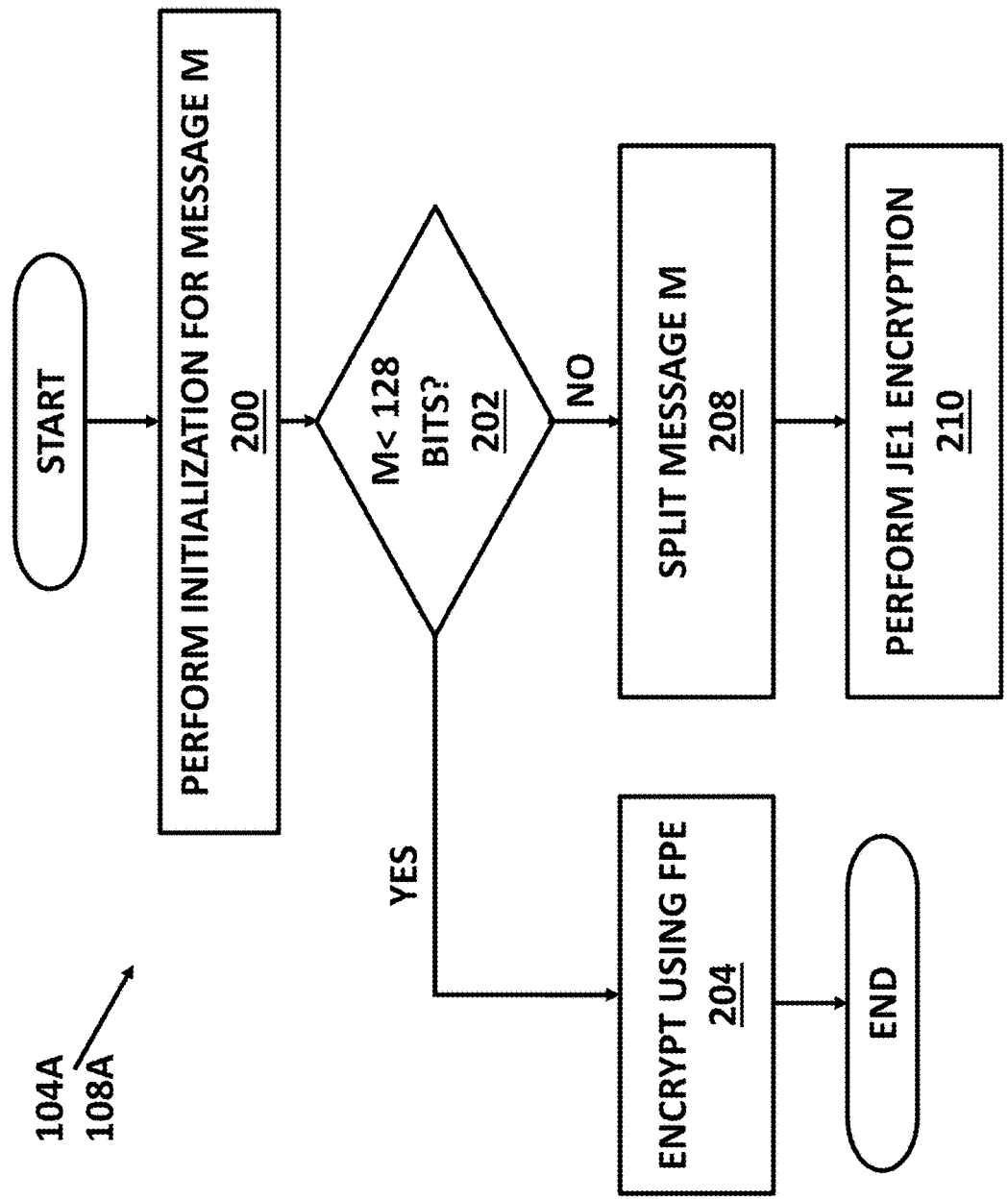

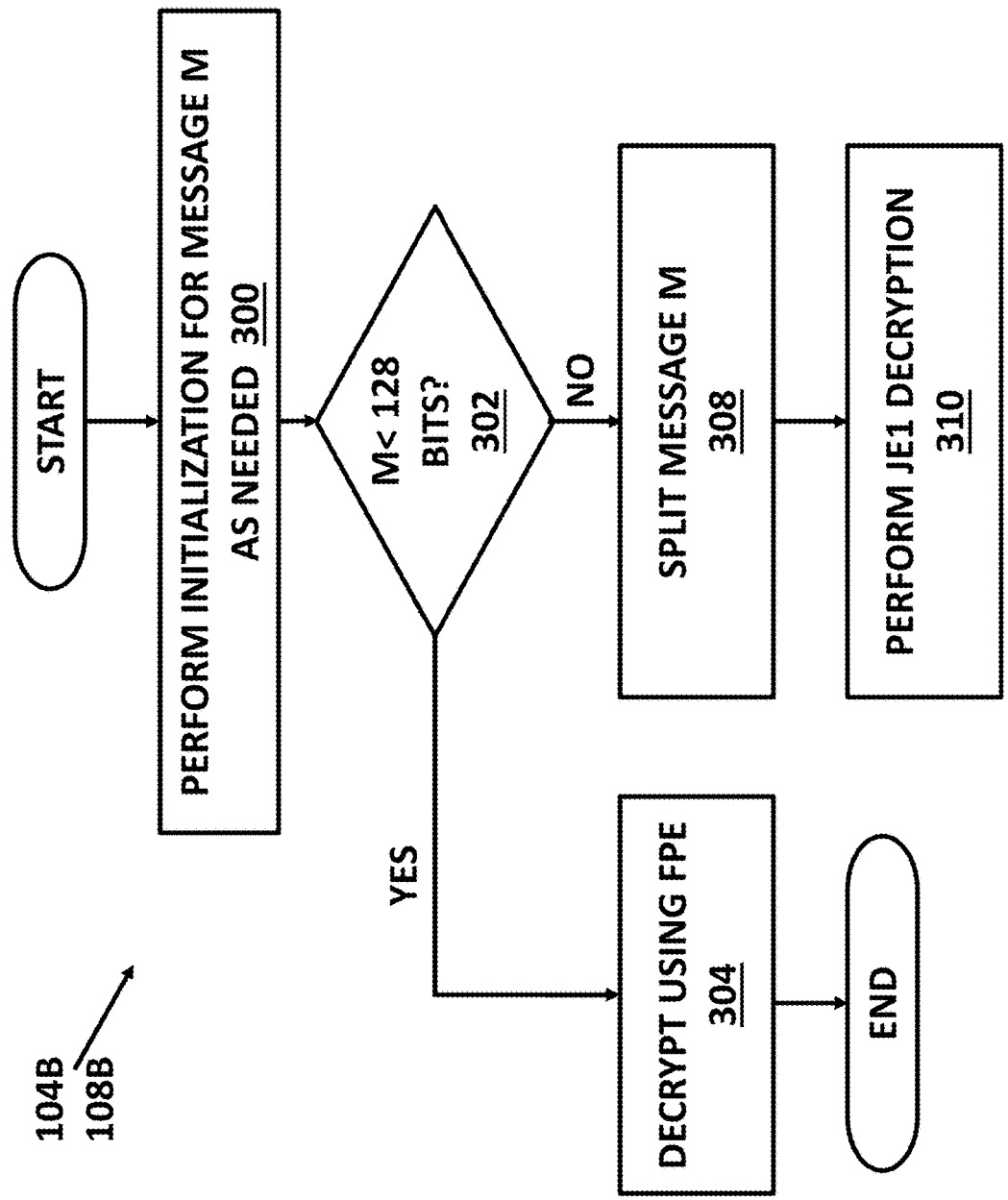

| Radix | Number of characters | Time for FF1 / Time for JE1 |
|---|---|---|
| 10 | 10 | 0.77 |
| | 100 | 2.30 |
| | 1,000 | 9.30 |
| | 10,000 | 418.00 |
| | 100,000 | 11,673.00 |
| 62 | 10 | 0.76 |
| | 100 | 1.70 |
| | 1,000 | 24.80 |
| | 10,000 | 1,099.00 |
| | 100,000 | 18,880.00 |
| 191 | 10 | 0.72 |
| | 100 | 2.10 |
| | 1,000 | 21.80 |
| | 10,000 | 1,378.00 |
| | 100,000 | 23,986.00 |

FIGURE 5

FORMAT PRESERVING ENCRYPTION (FPE) SYSTEM AND METHOD FOR LONG STRINGS

APPENDICES

Appendix A (31 pages) is a National Institute of Standards and Technology (NIST) Special Publication 800-38G Revision 1 Draft titled "Recommendation for Block Cipher Modes of Operation: Methods for Format-Preserving Encryption" dated February 2019 that describes the known format-preserving encryption (FPE) process including the FF1 algorithm. Appendix A is part of the specification.

Appendix B (12 pages) is an article by Granlund and Montgomery disclosing details of the division by invariant integers optimization and appendix B forms part of the specification.

FIELD

The disclosure relates to data privacy and data security and in particular to a system and method for encrypting data using format-preserving encryption.

BACKGROUND

Encryption is a well known technique to protect data and only allows the unprotected data (known as plaintext) to be viewed when a key (known as an encryption key) is provided that decrypts the encrypted data (known as ciphertext). Most encryption, such as the Advanced Encryption Standard-Counter (AES-CTR) mode encryption produces ciphertext that is longer than the plaintext and changes the format of the ciphertext to binary, so that both the storage format for the ciphertext and legacy functions that process the ciphertext have to be changed to accommodate the change in format and change in length of the ciphertext.

It is desirable to be able to encrypt a string containing sensitive data in a format-preserving manner so that the ciphertext can be stored and processed without sacrificing confidentiality or compatibility with existing storage mechanisms and legacy functions. For example, when data from a database with sensitive information is stored in a public cloud, the data is encrypted to reduce the loss of privacy due to a security breach in the public cloud. In order to retain compactness of the ciphertext and preserve compatibility with legacy functions that depend on the format of the ciphertext, the encryption can use a Format Preserving Encryption (FPE) method. A format is defined as a specific number of characters from a specific alphabet. For example, a credit card format is defined as a string of 16 characters where each character is a decimal digit in the range [0, 9]. After FPE encryption of a plain credit card number, the ciphertext looks like a credit card number so that the storage format for the ciphertext and processing of ciphertext using legacy functions remains unchanged.

Format preserving encryption is currently available. For example, FPE (and an FF1 algorithm) is described in a current National Institute of Standards and Technology (NIST) Special Publication 800-38G and Revision 1 Draft titled "Recommendation for Block Cipher Modes of Operation: Methods for Format-Preserving Encryption" dated March 2016 and February 2019, respectively (collectively the "NIST FF1 Algorithm Publication") (both of which form part of the specification and are incorporated herein by reference). Although the specification of the FF1 algorithm permits inputs with lengths up to $2^{32}$ characters, the method is fast for encrypting inputs of short inputs (up to 16 characters long), it is slow but usable for medium sized inputs (up to 100 characters), and it is prohibitively slow for longer inputs. A technical problem with the known FPE method cannot adequately handle longer inputs in an acceptable amount of time.

Currently, most systems, for long character inputs, still use a non-format preserving encryption method such as AES-CTR mode since the known FPE methods are unacceptable due to the slow speed. It is desirable to provide a format preserving encryption system and method that performs format preserving encryption for medium and longs strings of characters in the acceptable time to provide a technical solution to overcome the above technical problem of known FPE methods and it is to this end that the disclosure is directed.

BRIEF DESCRIPTION OF THE DRAWINGS

FIGS. 2A and 2B illustrate more details of the encryption element and process of the JEI system;

FIGS. 3A and 3B illustrate more details of the decryption element and process of the JEI system;

FIG. 5 is a table showing a comparison of the performance of FF1 and JE1 for a number of different character lengths.

DETAILED DESCRIPTION OF ONE OR MORE EMBODIMENTS

The disclosure is particularly applicable to a format-preserving encryption/decryption system for long character strings and it is in this context that the disclosure will be described. It will be appreciated, however, that the system and method has greater utility since it can be used with shorter character strings and may be implemented in other manners known in the art that form part of the disclosure. The JE1 system and method improves upon the known FF1 algorithm disclosed in the NIST FF1 Algorithm Publication and provides a technical solution to the above described technical problem with the FF1 algorithm with a secure and fast system and method to perform FPE of inputs up to $2^{128}$ characters as discussed below.

To better understand the JE1 system and method, the limitations and technical problems with the known FF1 algorithm are described. The FF1 algorithm uses the well-known Advanced Encryption Standard (AES) block cipher that is a standard encryption method that encrypts a block of 128 bits of plaintext to a block of 128 bits of ciphertext. The basic cipher can be used in modes such as AES-CTR mode for encrypting other block sizes, but these block sizes are constrained to be a power of 2 number of bits. Format Preserving Encryption (FPE) requires a plain string of n characters of radix a to be encrypted to a ciphertext string of n characters of radix a. Characters of radix a are integers in the range [0, a−1]. When the radix a is not power of 2, a straightforward application of the AES-CTR mode fails, so standard algorithms such as FF1 use repeated invocations of the basic AES to perform FPE. Thus, an FF1 encryption operation invokes the basic AES cipher 10 times for every 256 bits of input and it uses big number arithmetic (implemented in software) to perform 10 modulo $a^{n/2}$ operations for inputs with n characters. For small inputs, the 10 invocations of AES make FF1 slower than AES-CTR mode, which invokes AES just once per 128-bits. However for larger inputs, the big number arithmetic operations are the dominant factor in the slowdown of FF1 (the speed of the encryption that is the technical problem) because the modulo operation time is quadratic in the input size (which implies that doubling the size of the input quadruples the time required by the arithmetic operations).

The JE1 FPE system and method addresses the shortcomings in the performance of FF1 (and thus provides a technical solution to the FF1 performance problem) in two ways. First, JE1 reduces the number of AES invocations per 128 bits of input to slightly more than 3 as discussed below in more detail. Second, JE1 uses big number arithmetic only during initialization that is performed once, but then, during the encryption and decryption operations that are performed repeatedly, JE1 always uses hardware arithmetic operations that have much better performance. The result is that JE1 is much faster than FF1 as shown in FIG. 5 that is discussed below in more detail.

Figure 1:
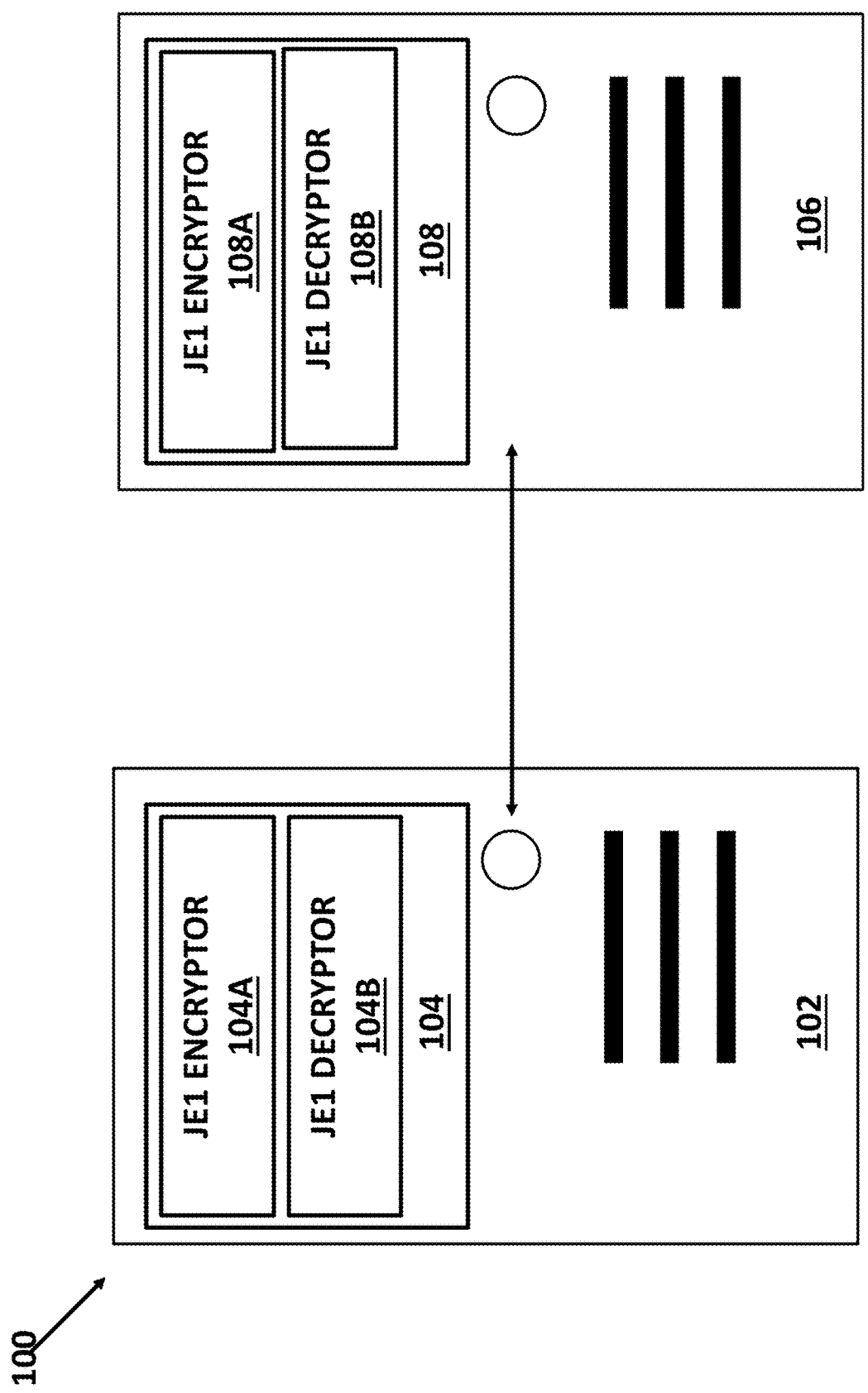
FIG. 1 is an example of a computer server implementation of a Just Encrypt 1 (JE1) system.

FIG. 1 is an example of a computer server implementation of a Just Encrypt 1 (JE1) system 100 in which each computing device 102, 106 can perform JE1 encryption or decryption processes as shown. However, in the JE1 system, each computing device 102, 106 may perform only one of the processes. For example, the first computing device 102 may only perform the JE1 encryption process while the second computing device 106 may only perform the JE1 decryption process. Furthermore, while each computing device is shown as a computer system/server computer in FIG. 1, one or both of the computing devices 102, 106 may be implemented in a smart phone device, a tablet computer, a terminal device and the like and thus the JE1 system may be implemented in various known computing devices or yet to be developed computing devices. Each computing device 102, 106 may have at least one processor and memory. In a software embodiment of the system, each of the encryption process and decryption process may be a plurality of lines of computer code/instructions that are executed by the at least one processor so that the processor (and computing device) are configured to perform the encryption operation or decryption operation as discussed below. In some embodiments, certain portions of the process may be performed in hardware as discussed below. In a hardware embodiment of the system, each of the encryption process and decryption process may be implemented in an ASIC, microcontroller, integrated circuit that is able to perform the JE1 processes.

In the example in FIG. 1, the two computing devices 102, 106 may be capable of communicating and exchanging data with each other over a communication path. Thus, the systems can exchange JE1 encrypted data and then decrypt that encrypted data. However, the JE1 system may be solely a computer system that has the JE1 encryption element (a JE1 encryption embodiment of the system) or solely one or more computer systems that each have the JE1 decryption element (a JE1 decryption embodiment of the system). In an alternate embodiment, both JE1 encryption and JE1 decryption are resident on a single computer system and both processes are done by the single computer system at a customer premises. In operation, the encrypted data is stored and processed in an insecure environment in a public cloud in the period between encryption and decryption. In this alternative embodiment, the JE1 system performs encryption for storage.

In the embodiment in FIG. 1, each computing device 102, 106 may include a JEI encryption element/circuit 104A, 108A that performs the JE1 encryption process as discussed below with reference to FIG. 2 and a JEI decryption element/circuit 104B, 108B that performs the JE1 decryption process as discussed below with reference to FIG. 3. For both encryption and decryption, the JE1 system uses the FPE.Encrypt or FPE.Decrypt processes disclosed in Appendix A that forms part of the specification.

Figure 2B:
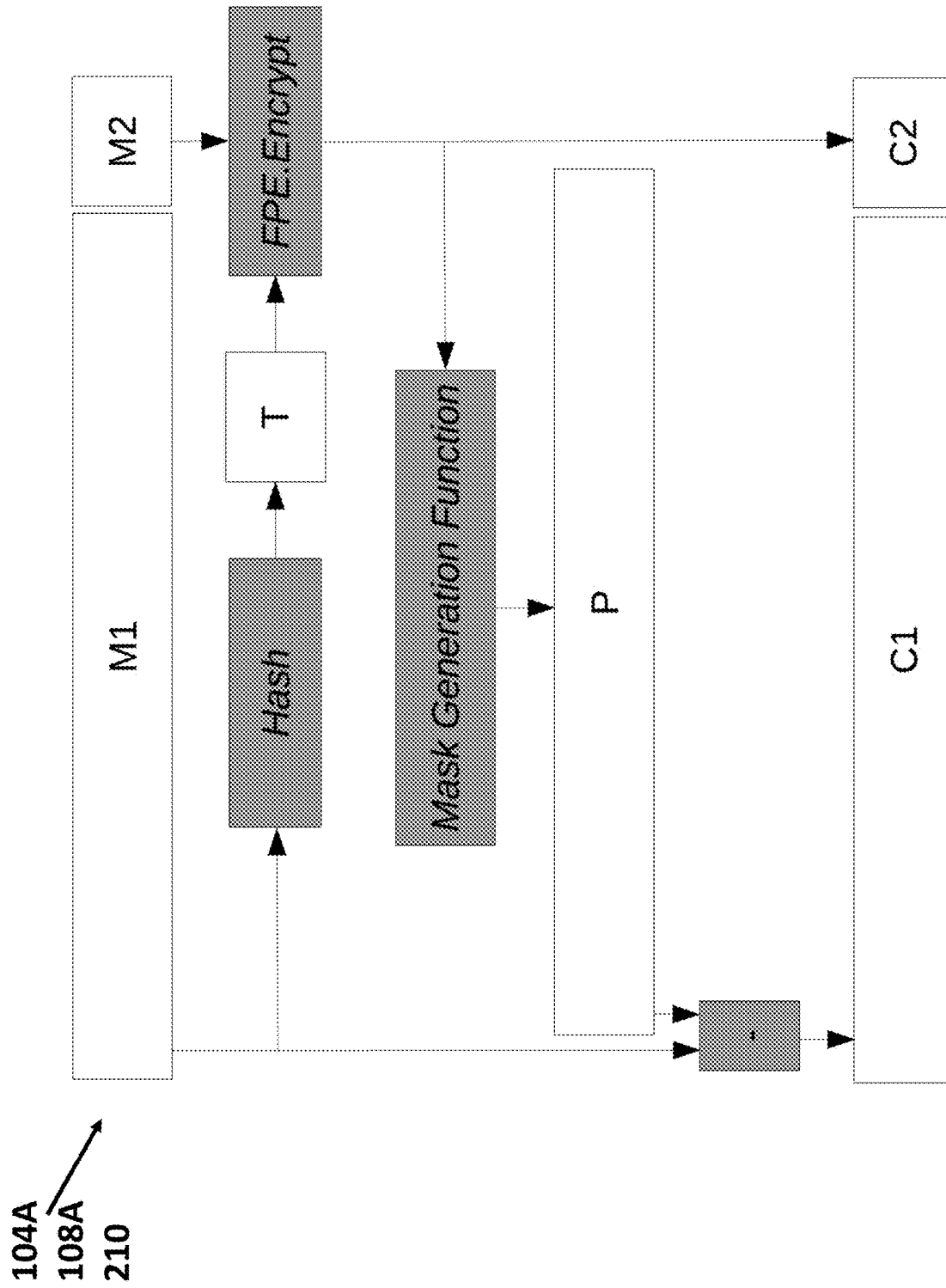

FIGS. 2A and 2B illustrate more details of the encryption element 104A, 108B and encryption process of the JEI system. JE1 encryption takes a plain message M with n characters of radix a and produces a cipher text C with n characters. During encryption, the input M may be processed in two segments (M1 and M2) to output two segments (C1 and C2). As shown in FIG. 2A, the encryption method may perform an initialization process for the radix "a" that defines the format of all messages (200) during which the big arithmetic is performed. Note that this initialization process is performed once when the JE1 encryption process is started and not for each message M. The initialization process sets up 4 keys and 4 constants that are used in the mask generation process discussed in more detail below with reference to FIG. 4. Given a secret key K for JE1, the initialization derives 4 keys, the first key $K_{hash}$ is for the hash function, the second key $K_{fpe}$ is for the embedded FPE function, and the third and fourth keys $K_{mgf1}$ and $K_{mgf2}$ are for the mask generation process. Given a radix a, the initialization process employs big number arithmetic to compute 64-bit integer constants named $l_{ak}$, $m_{ak}$, $l_a$, and $m_a$ for the modulo arithmetic using hardware operations on 64-bit processors. These 4 constants are explained later in the description of the optimization of the mask generation process.

When the initialization is completed or completed for radix "a", the encryption method determines if the message size is less than 128 bits (202). If the message is less than 128 bits, then the message M is encrypted using the existing FPE process (204) and the encryption is completed for the short length message. If the message M is greater than or equal to 128 bits, the message M is split into one or more parts (208). In particular, the method may split the message M with n characters of radix a into a suffix M2 of length s characters and a prefix M1 of length n−s characters. The suffix length s is chosen to be the smallest integer such that $a^s >= 2^{128}$.

Using the prefix and suffix parts (M1 and M2), the encryption elements 104A, 108A may perform the JE1 encryption that is shown in more detail in FIG. 2B. The JE1 encryption may consist of 4 operations including a hash function (hash in FIG. 2B), a format preserving encryption/decryption (FPE.Encrypt in FIG. 2B), a mask generating function, and a vector subtraction function denoted by "−" in FIG. 2B.

During the JE1 encryption process as shown in FIG. 2B, the method computes a digest of the prefix M1 using a keyed hash function (such as AES-CMAC or any other suitable hash function) with the key $K_{hash}$ that was generated during the initialization process. Similar to the tweak to FPE discussed in Appendix A, a tweak T' may be input to the JE1 system and process. The method as shown in FIG. 2B may append the digest D to this tweak T' to compute the tweak T shown in FIG. 2B that is used for FPE encryption using the FPE.Encrypt process disclosed in Appendix A. If a tweak T' is not supplied to the JE1 encryption process, then the tweak T used for the FPE encryption consists of just the digest D.

The method may then invoke FPE.encrypt with key $K_{fpe}$ and tweak T on suffix message M2 with s characters to produce ciphertext C2 with s characters of radix a. In this method, FPE.encrypt process may be the known FPE encryption described in Appendix A and in particular the disclosed FF1 algorithm in one embodiment. The method may then apply the mask generation function (discussed below with reference to FIG. 4) to input C2 to produce pad P with n−s characters of radix a. Once the pad has been generated, the method may perform a vector subtraction of the prefix message M1 from the pad P to output ciphertext $C_1$ such that $C_1[i]=P[i] M_1[i]$ mod a for $0<=i<n-s$. Since both vectors $M_1$ and P contain n−s characters of radix a and subtraction is performed for each character modulo a, the output $C_1$ is a vector of n−s characters of radix a. The output of the JE1 encryption is ciphertext C that is the concatenation of $C_1$ and $C_2$. The above process thus reduces the number of characters being FPE encrypted thus reducing the number of times that AES must be invoked.

Figure 3B:
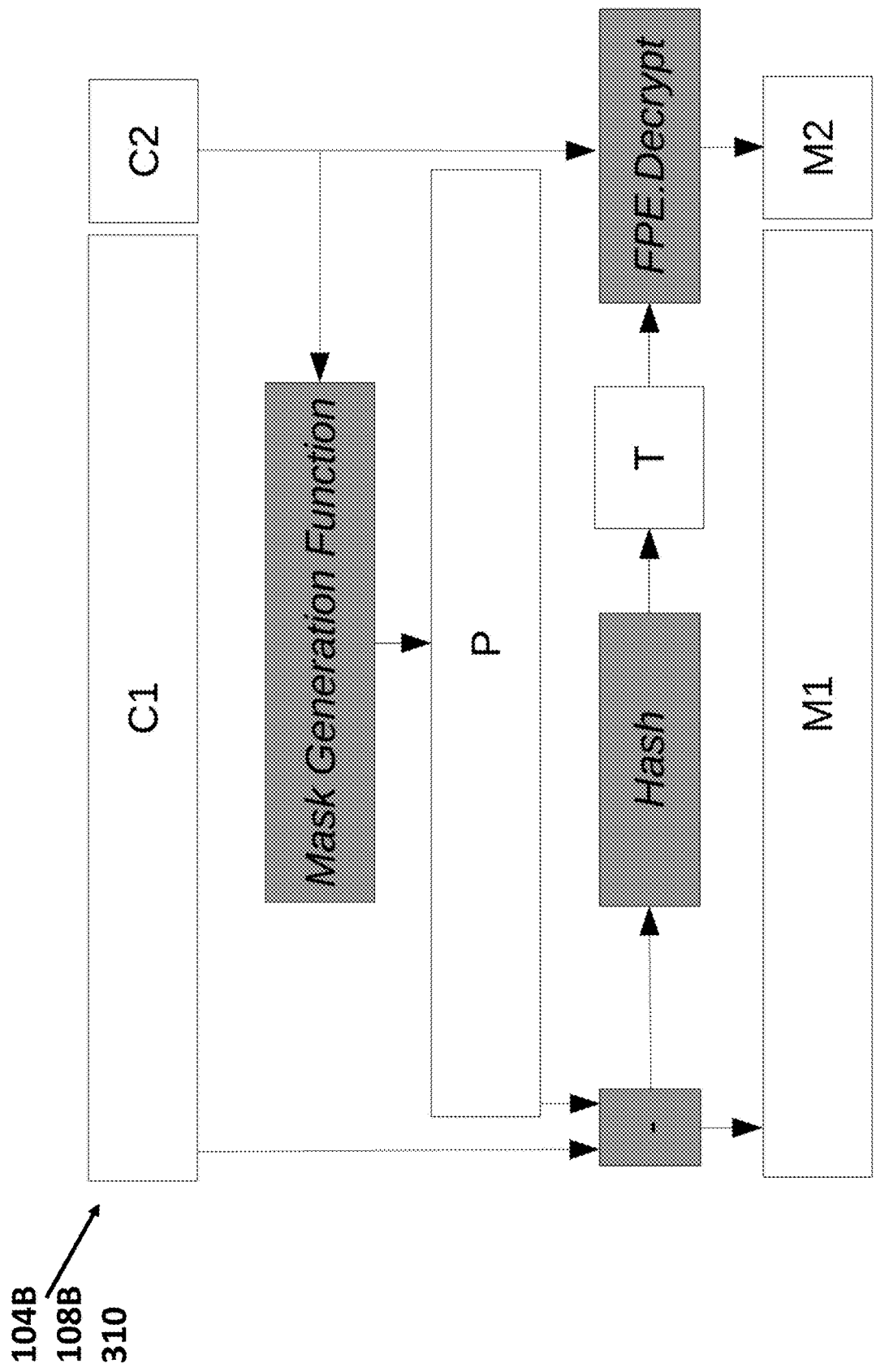

FIGS. 3A and 3B illustrate more details of the decryption element and JE1 decryption process of the JEI system. A similar initialization process is performed (300) as needed, but may be unnecessary if the JE1 system has already been previously initialized or a prior message has already been decrypted. When the initialization is completed, the decryption method determines if the ciphertext (C) size is less than 128 bits (302). If the ciphertext is less than 128 bits, then the ciphertext C is decrypted using the existing FPE decrypt process (such as using the described FF1 decryption algorithm in Appendix A) (304) and the decryption is completed for the short length ciphertext. If the ciphertext C is greater than or equal to 128 bits, the ciphertext C is split into one or more parts (308). In particular, the method may split the ciphertext C with n characters of radix a into a suffix $C_2$ of length s characters and a prefix $C_1$ of length n−s characters. The suffix length s is chosen to be the smallest integer such that $a^s>=2^{128}$.

Using the prefix and suffix parts ($C_1$ and $C_2$), the decryption elements 104B, 108B may perform the JE1 decryption that is shown in more detail in FIG. 3B. The JE1 decryption may consist of 4 operations including a hash function (hash in FIG. 3B), a format preserving encryption/decryption (FPE.Decrypt in FIG. 3B), a mask generating function, and a vector subtraction function denoted by "−" in FIG. 3B. The JE1 decryption performs the reverse operations as encryption to decrypt the ciphertext to reveal the original message M in plaintext.

For a longer length ciphertext, the JE1 decryption process call the mask generation function (whose operation is described in more detail below with reference to FIG. 4) with input C2 to produce pad P with n−s characters of radix a. The method may then perform a vector subtraction of the prefix ciphertext C1 from the pad P to output prefix message $M_1$ such that $M_1[i]=P[i]-C_1[i]$ mod a for $0<=i<n-s$. The method may then compute the digest of the prefix M1 using a keyed hash function (Hash in FIG. 3B) with key $K_{hash}$. As above for encryption, a tweak is supplied to the process and the method appends the digest of $M_1$ to the tweak to JE1 decryption to produce a tweak T for the embedded FPE decryption (FPE.Decrypt in FIG. 3B). Similar to the encryption above, if no tweak is supplied, then the tweak T is just the digest. The method then invokes the FPE.decrypt process with key $K_{fpe}$ and tweak T on the suffix ciphertext C2 to produce message $M_2$. The method then outputs plaintext message M is the concatenation of $M_1$ and $M_2$.

Figure 4:
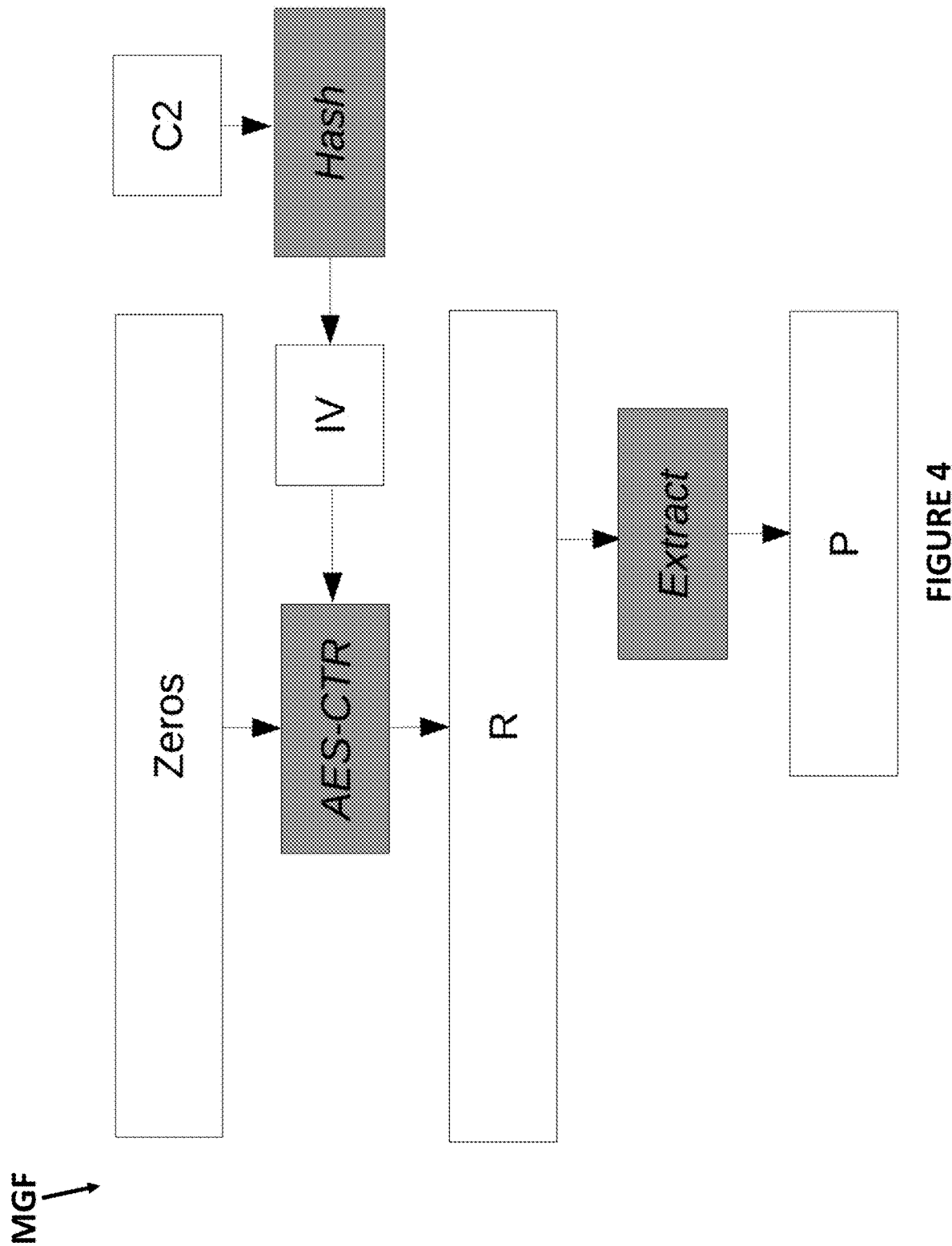
FIG. 4 illustrate more details of the mask generation element of the JEI system used for both encryption and decryption.

FIG. 4 illustrate more details of the mask generation element of the JEI system (and the mask generation process MGF) used for both encryption and decryption. The input to the MGF may be a vector $C_2$ containing s characters of radix a and the output of the MGF is pad P, which is a vector containing n−s pseudo-random characters of radix a that depends only on keys $K_{mgf1}$, $K_{mgf2}$, and input $C_2$. The initialization for the MGF computes constants that are used for modulo operations using hardware that may be, in some embodiments, a hardware integer multiplier present in any modern CPU. In one embodiment, 64-bit hardware for 64-bit arithmetic may be used, but the method can be adapted for other bit lengths. The MGF initialization first computes k=floor(31/log$_2$(a)) as the maximum number of characters of radix a that can fit in a positive 32-bit integer. The MGF may use two arithmetic operations including v mod $a^k$ and w mod a, where v, w, $a^k$, and a are 64-bit positive integers.

After initialization, the mask generation operation may compute a digest (an initialization vector iv) of input $C_2$ using a keyed hash function (such as AES-CMAC or other keyed hash function) such that iv=CMAC($K_{mgf1}$, $C_2$). The "Zeros" element in FIG. 4 may be a vector of z zero bytes where z=8*ceiling((n−s)/k). The method may then compute pseudo-random pad R with the z bytes as the AES-CTR mode encryption of zeros with initialization vector iv such that R=AES-CTR($K_{mgf2}$, iv, zeros).

From each block of 8 bytes from pad R, the method may extract k characters of radix a into block pad p. In particular, the extraction process may set v to a 64-bit positive integer obtained by setting the most significant bit of the 8 byte block to 0 and then calculate w=v mod $a^k$. The extraction process, for i=0 to k−1, may then calculate p[i]=w mod a and w=w/a. Based on the extraction, the output pad P containing n−s pseudo-random characters of radix a is the first n−s characters of the concatenation of the block pads p.

The mask generation method generates k random characters from every 8 bytes of AES-CTR output as described above. Since the statistical distance between a uniform distribution of random integers in the range [0, N−1] and the distribution of the integers derived from mod M operations in the range [0, N mod M] where M<N can be as large as M/4N, there is a need to minimize the bias in the values after the modulo operation by minimizing the value of M compared to N. On the other hand, the number of AES invocations for computing the pseudo-random pad R is minimized by maximizing the value of M compared to N. The JE1 system and method selects a value of k that balances between the two requirements by choosing M=$a^k$ and N=$2^{63}$, with the constraint that $a^k<2^{31}$ so that the statistical distance between the distribution of w=v mod $a^k$ and the distribution of random v is at most $1/2^{34}$ which is similar to the bias in the FF1 algorithm.

Since modulo operations require division but hardware division is much slower than hardware multiplication, the MGF implementation shown in FIG. 4 employs the Division by Invariant Integers optimization of Granlund and Montgomery (See Appendix B that forms part of the specification that is an article by Granlund and Montgomery that discloses the details of the division by invariant integers optimization) to replace the division operations with multiplications by the "reciprocals" of $a^k$ and a. For the first modulo operation that divides by $a^k$, the JE1 initialization function uses big number arithmetic to compute two 64-bit constants: $l_{ak}$=ceiling(log$_2$($a^{31}$)) and $m_{ak}$=floor($2^{63+l a k}/a^k$)−$2^{63}$+1.

During mask generation, for computing w=v mod ak, instead of using hardware division, the modulo operation is computed using a sequence of multiplications and right-shift operations as:

$t_{ak}$=rightshift($m_{ak}*a^k$,63)

$q_{ak}$=rightshift($t_{ak}$+rightshift($a^k-t_{ak}$,1),$l_{ak}$−1)

$w=v-q_{ak}*a^k$

For the second modulo operation that divides by a, the JE1 initialization function computes two 64-bit constants: $l_a$=ceiling($\log_2(a)$) and $m_a$=floor($2^{31+l_a}/a$)$-2^{31}+1$.

During mask generation, for computing p[i]=w mod a and w=w/a, instead of using hardware division, the JE1 method uses a sequence of multiplications and right-shift operations as:

$$t_a = \text{rightshift}(m_a * a, 31)$$

$$q_a = \text{rightshift}(t_a + \text{rightshift}(a - t_a, 1), l_a - 1)$$

$$p[i] = w - q_a * a$$

$$w = q_a$$

The number of AES invocations in JE1 encryption are about 10 invocations for the FPE encryption of the suffix message M2, about 1 invocation for computing the message digest using AES-CMAC for every 128 bits of the prefix M1, 2 invocations of AES for computing the AES-CMAC in the MGF, and 1 invocation of AES during the MGF for every k characters of the n−s characters of pad P. Thus, the total number of invocations of AES is slightly more than 3 times the number of 128-bit blocks in the input message M and significantly less than the number of AES invocations for the typical FPE algorithm in Appendix A.

FIG. 5 is a table showing a comparison of the performance of known FF1 algorithm in Appendix A to the disclosed JE1 method for a number of different character lengths. In the table in FIG. 5, the comparison is shown as a ratio of the time to complete the process using FFI to the time to complete the process using JEI wherein a value of 1 indicates that the FF1 algorithm and the JE1 method perform the process in the same time, a value of less than one indicates that the FFI algorithm is faster than the JEI method and a value greater than 1 indicates that the JE1 method performs the process faster than FF1. The performance data shown in FIG. 5 was derived by implementing the JE1 method in a product that provides encryption for commercial databases such as MySQL, MariaDB, Postgres, and Microsoft SQL Server that are deployed in public clouds such as Amazon Web Services, Microsoft Azure, and IBM Cloud and measuring the performance of the known FF1 algorithm and the JE1 method. As shown in FIG. 5, the times required to run JE1 were measured and compared with the time required to run FF1 for different values of radix and string length (measured as a number of characters) and observed speedups of JE1 over FF1.

FIG. 5 shows that although JE1 is slower that FF1 for small input lengths (10 characters in which the ratio is less than 1), for longer inputs, JE1 is much faster than FF1 shown by the very large comparison ratios. Furthermore, JE1 has the greatest speed advantage over FF1 at the largest number of characters. The speed of JE1 makes it practical to perform FPE of long inputs.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media.

Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A format-preserving encryption method, comprising:
   receiving a plaintext message having a predetermined number of characters;
   performing format-preserving encryption on the plaintext message to generate ciphertext, wherein a format and a length of the plaintext message is the same as a format and a length of the ciphertext; and
   wherein performing the format-preserving encryption on the plaintext message further comprises invoking an advanced encryption standard (AES) block cipher operation less than 10 times for each 256 bits of the plaintext message.

2. The method of claim 1 further comprising performing an initialization to generate four encryption keys and four constants using big number arithmetic and wherein performing the format-preserving encryption on the plaintext message further comprises using at least one of the generated encryption keys and performing hardware arithmetic operations.

3. The method of claim 2, wherein performing the format-preserving encryption on the plaintext message further comprises performing hardware multiplication using at least one of the four constants.

4. The method of claim 2, wherein generating the four encryption keys further comprises generating a hash key, a format-preserving encryption key, a first mask generation key and a second mask generation key.

5. The method of claim 1, wherein performing the format-preserving encryption on the plaintext message further comprises performing an FPE algorithm for the plaintext message when the plaintext message is less than 128 bits to generate the ciphertext.

6. The method of claim 5, wherein performing the format-preserving encryption on the plaintext message further comprises performing a just encrypt one (JE1) encryption process for the plaintext message when the plaintext message is more than 128 bits to generate the ciphertext.

7. The method of claim 6, wherein performing the JE1 encryption process for the plaintext message further comprises splitting the plaintext into a prefix message and a suffix message, performing a hash operation on the prefix message to generate a digest, generating a tweak variable, performing FPE encryption using the FPE algorithm on the suffix message using the tweak variable to generate a suffix ciphertext, generating, using a mask generation operation applied to the suffix ciphertext, a pad, performing a vector subtraction of the prefix message from the generated pad to generate a prefix ciphertext and concatenating the prefix ciphertext and the suffix ciphertext to generate the ciphertext.

8. The method of claim 7, wherein generating the tweak variable further comprises combining an input tweak variable with the digest to generate the tweak variable or generating the tweak variable using the digest.

9. The method of claim 1, wherein performing the format-preserving encryption on the plaintext message further comprises invoking an advanced encryption standard (AES) block cipher operation less than seven times for each 256 bits of the plaintext message.

10. A format-preserving encryption apparatus, comprising:
   a computer system having a processor that executes a plurality of lines of instructions so that the processor is configured to:
      receive a plaintext message having a predetermined number of characters;
      perform format-preserving encryption on the plaintext message to generate ciphertext, wherein a format and a length of the plaintext message is the same as a format and a length of the ciphertext; and
      wherein the format-preserving encryption on the plaintext message is performed by invoking an advanced encryption standard (AES) block cipher operation less than 10 times for each 256 bits of the plaintext message.

11. The apparatus of claim 10, wherein the processor is further configured to perform an initialization to generate four encryption keys and four constants using big number arithmetic and to perform hardware arithmetic operations using at least one of the generated encryption key.

12. The apparatus of claim 11, wherein the processor is further configured to perform hardware multiplication using at least one of the four constants.

13. The apparatus of claim 11, wherein the processor is further configured to generate a hash key, a format-preserving encryption key, a first mask generation key and a second mask generation key.

14. The apparatus of claim 10, wherein the processor is further configured to perform an FPE algorithm for the plaintext message when the plaintext message is less than 128 bits to generate the ciphertext.

15. The apparatus of claim 14, wherein the processor is further configured to perform a just encrypt one (JE1) encryption process for the plaintext message when the plaintext message is more than 128 bits to generate the ciphertext.

16. The apparatus of claim 15, wherein the processor is further configured to split the plaintext into a prefix message and a suffix message, perform a hash operation on the prefix message to generate a digest, generate a tweak variable, perform FPE encryption using the FPE algorithm on the suffix message using the tweak variable to generate a suffix ciphertext, generate, using a mask generation operation applied to the suffix ciphertext, a pad, perform a vector subtraction of the prefix message from the generated pad to generate a prefix ciphertext and concatenate the prefix ciphertext and the suffix ciphertext to generate the ciphertext.

17. The apparatus of claim 16, wherein the processor is further configured to combine an input tweak variable with the digest to generate the tweak variable or generate the tweak variable using the digest.

18. The apparatus of claim 10, wherein the processor is further configured to invoke an advanced encryption standard (AES) block cipher operation less than seven times for each 256 bits of the plaintext message.

19. A format-preserving decryption method, comprising:
   receiving a ciphertext having a predetermined number of characters;
   performing format-preserving decryption on the plaintext message to generate plaintext, wherein a format and a length of the ciphertext is the same as a format and a length of the plaintext; and
   wherein performing the format-preserving decryption on the ciphertext further comprises invoking an advanced encryption standard (AES) block cipher operation less than 10 times for each 256 bits of the ciphertext.

20. The method of claim 19 further comprising performing an initialization to generate four keys and four constants using big number arithmetic and wherein performing the format-preserving decryption on the ciphertext further comprises performing hardware arithmetic operations using at least one of the generated key.

21. The method of claim 20, wherein performing the format-preserving encryption on the plaintext message further comprises performing hardware multiplication using at least one of the four constants.

22. The method of claim 20, wherein generating the four keys further comprises generating a hash key, a format-preserving decryption key, a first mask generation key and a second mask generation key.

23. The method of claim 19, wherein performing the format-preserving decryption on the ciphertext further comprises performing an FPE decryption algorithm on the ciphertext when the ciphertext is less than 128 bits to generate the plaintext.

24. The method of claim 23, wherein performing the format-preserving decryption on the ciphertext further comprises performing a just encrypt one (JE1) decryption process for the ciphertext when the ciphertext is more than 128 bits to generate the plaintext.

25. The method of claim 24, wherein performing the JE1 decryption process for the ciphertext message further comprises splitting the ciphertext into a prefix and a suffix, generating, using a mask generation operation applied to the suffix, a pad, performing a vector subtraction of the prefix and the generated pad to generate a prefix plaintext message, performing a hash operation on the prefix to generate a digest, generating a tweak variable, performing FPE decryption using the FPE algorithm on the suffix using the tweak variable to generate a suffix plaintext and concatenating the prefix plaintext message and the suffix plaintext to generate the plaintext message.

26. The method of claim 25, wherein generating the tweak variable further comprises combining an input tweak variable with the digest to generate the tweak variable or generating the tweak variable using the digest.

27. The method of claim 19, wherein performing the format-preserving decryption on the ciphertext message further comprises invoking an advanced encryption standard (AES) block cipher operation less than seven times for each 256 bits of the ciphertext.

28. A format-preserving decryption apparatus, comprising:
a computer system having a processor that executes a plurality of lines of instructions so that the processor is configured to:
receive a ciphertext having a predetermined number of characters;
perform format-preserving decryption on the plaintext message to generate plaintext, wherein a format and a length of the ciphertext is the same as a format and a length of the plaintext; and
wherein the format-preserving decryption on the ciphertext invokes an advanced encryption standard (AES) block cipher operation less than 10 times for each 256 bits of the ciphertext.

29. The apparatus of claim 28, wherein the processor is further configured to perform an initialization to generate four keys and four constants using big number arithmetic and wherein the processor is further configured to perform the format-preserving decryption on the ciphertext using hardware arithmetic operations using at least one of the generated key.

30. The apparatus of claim 29, wherein the processor is further configured to perform hardware multiplication using at least one of the four constants.

31. The apparatus of claim 29, wherein the processor is further configured to generate a hash key, a format-preserving decryption key, a first mask generation key and a second mask generation key.

32. The apparatus of claim 28, wherein the processor is further configured to perform an FPE decryption algorithm on the ciphertext when the ciphertext is less than 128 bits to generate the plaintext.

33. The apparatus of claim 32, wherein the processor is further configured to perform a just encrypt one (JE1) decryption process for the ciphertext when the ciphertext is more than 128 bits to generate the plaintext.

34. The apparatus of claim 33, wherein the processor is further configured to split the ciphertext into a prefix and a suffix, generate, using a mask generation operation applied to the suffix, a pad, perform a vector subtraction of the prefix and the generated pad to generate a prefix plaintext message, perform a hash operation on the prefix to generate a digest, generate a tweak variable, perform FPE decryption using the FPE algorithm on the suffix using the tweak variable to generate a suffix plaintext and concatenate the prefix plaintext message and the suffix plaintext to generate the plaintext message.

35. The apparatus of claim 34, wherein the processor is further configured to combine a new tweak variable with the digest to generate the tweak variable or generate the tweak variable using the digest.

36. The apparatus of claim 28, wherein the processor is further configured to invoke an advanced encryption standard (AES) block cipher operation less than seven times for each 256 bits of the ciphertext.

* * * * *